United States Patent
Foerster

(10) Patent No.: US 9,883,655 B2
(45) Date of Patent: Feb. 6, 2018

(54) APPARATUS FOR FEEDING ANIMALS

(71) Applicant: FOERSTER TECHNIK GMBH, Engen (DE)

(72) Inventor: Thomas Foerster, Engen (DE)

(73) Assignee: Förster Technik GmbH, Engen (DE)

( * ) Notice: Subject to any disclaimer, the term of this patent is extended or adjusted under 35 U.S.C. 154(b) by 211 days.

(21) Appl. No.: 14/162,189

(22) Filed: Jan. 23, 2014

(65) Prior Publication Data
US 2014/0261206 A1   Sep. 18, 2014

(30) Foreign Application Priority Data

Jan. 24, 2013 (DE) .................. 10 2013 100 716
Jan. 22, 2014 (DE) .................. 10 2014 100 706

(51) Int. Cl.
*A01K 5/00* (2006.01)
*A01K 9/00* (2006.01)

(52) U.S. Cl.
CPC .............. *A01K 5/00* (2013.01); *A01K 9/00* (2013.01); *A01K 9/005* (2013.01)

(58) Field of Classification Search
CPC .. A01K 5/00; A01K 9/00; A01K 9/005; A61J 9/00; A61J 9/02; A47J 41/02; B65D 81/3846
USPC .............. 119/14.01, 14.47, 72, 73, 71; 215/11.1–11.6, 13.1
See application file for complete search history.

(56) References Cited

U.S. PATENT DOCUMENTS

| | | | | |
|---|---|---|---|---|
| 2,329,245 A * | 9/1943 | Bruehl | ...... | A01K 9/00 119/71 |
| 2,625,643 A * | 1/1953 | Cordis | ...... | A01J 5/06 119/14.02 |
| 2,714,368 A * | 8/1955 | Voigt | ...... | A01K 9/005 119/71 |
| 3,294,066 A * | 12/1966 | Seay | ...... | A01K 9/00 119/51.11 |
| 4,248,177 A * | 2/1981 | Peterson | ...... | A01K 7/06 119/73 |
| 5,397,031 A * | 3/1995 | Jensen | ...... | A47J 36/2433 222/146.5 |
| 6,513,359 B1 | 2/2003 | Binder et al. | | |
| 6,581,542 B1 * | 6/2003 | Forster | ...... | A01K 9/005 119/51.02 |
| 8,146,760 B1 * | 4/2012 | Leach | ...... | A61J 9/00 215/11.1 |
| 8,319,154 B2 * | 11/2012 | Shaikh | ...... | A47J 36/2411 165/104.17 |
| 8,336,495 B1 * | 12/2012 | Dumm | ...... | A01K 9/00 119/71 |

(Continued)

FOREIGN PATENT DOCUMENTS

DE   19604199 C1   4/1997
DE   29603702 U1   7/1997

(Continued)

*Primary Examiner* — David Parsley
*Assistant Examiner* — Danielle Clerkley
(74) *Attorney, Agent, or Firm* — Bachman & LaPointe, PC

(57) ABSTRACT

An apparatus for feeding animals with a feedstuff, in particular with a liquid feedstuff from an automatic feeder, wherein the feedstuff is suppliable optionally via a component (7.1 to 7.3) of an output device (1.1, 1.2), wherein the component (7.1 to 7.3) and/or the output device (1.1, 1.2) include means for temperature control.

22 Claims, 4 Drawing Sheets

(56) References Cited

U.S. PATENT DOCUMENTS

| | | | | |
|---|---|---|---|---|
| 8,408,408 B1* | 4/2013 | Dumm | ..................... | A61J 11/04 |
| | | | | 119/71 |
| 8,951,589 B2* | 2/2015 | Devlin | ..................... | A23C 3/03 |
| | | | | 165/186 |
| 2006/0255049 A1* | 11/2006 | McCarthy | .......... | A47G 19/2205 |
| | | | | 220/703 |
| 2011/0151069 A1* | 6/2011 | Harding | .................. | A61J 9/001 |
| | | | | 426/117 |

FOREIGN PATENT DOCUMENTS

| DE | 29606172 U1 | 7/1997 |
|---|---|---|
| DE | 19845186 A1 | 4/2000 |

\* cited by examiner

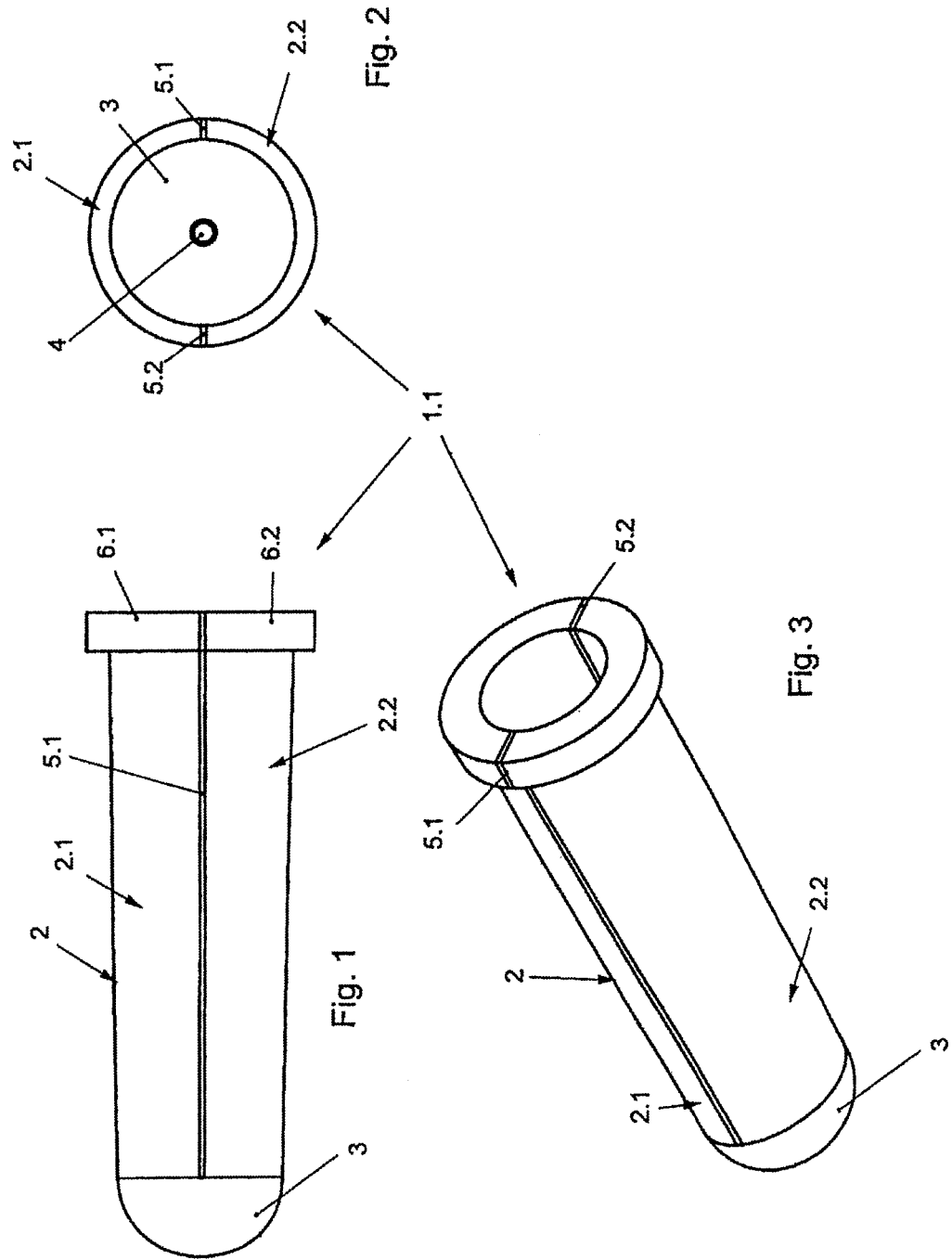

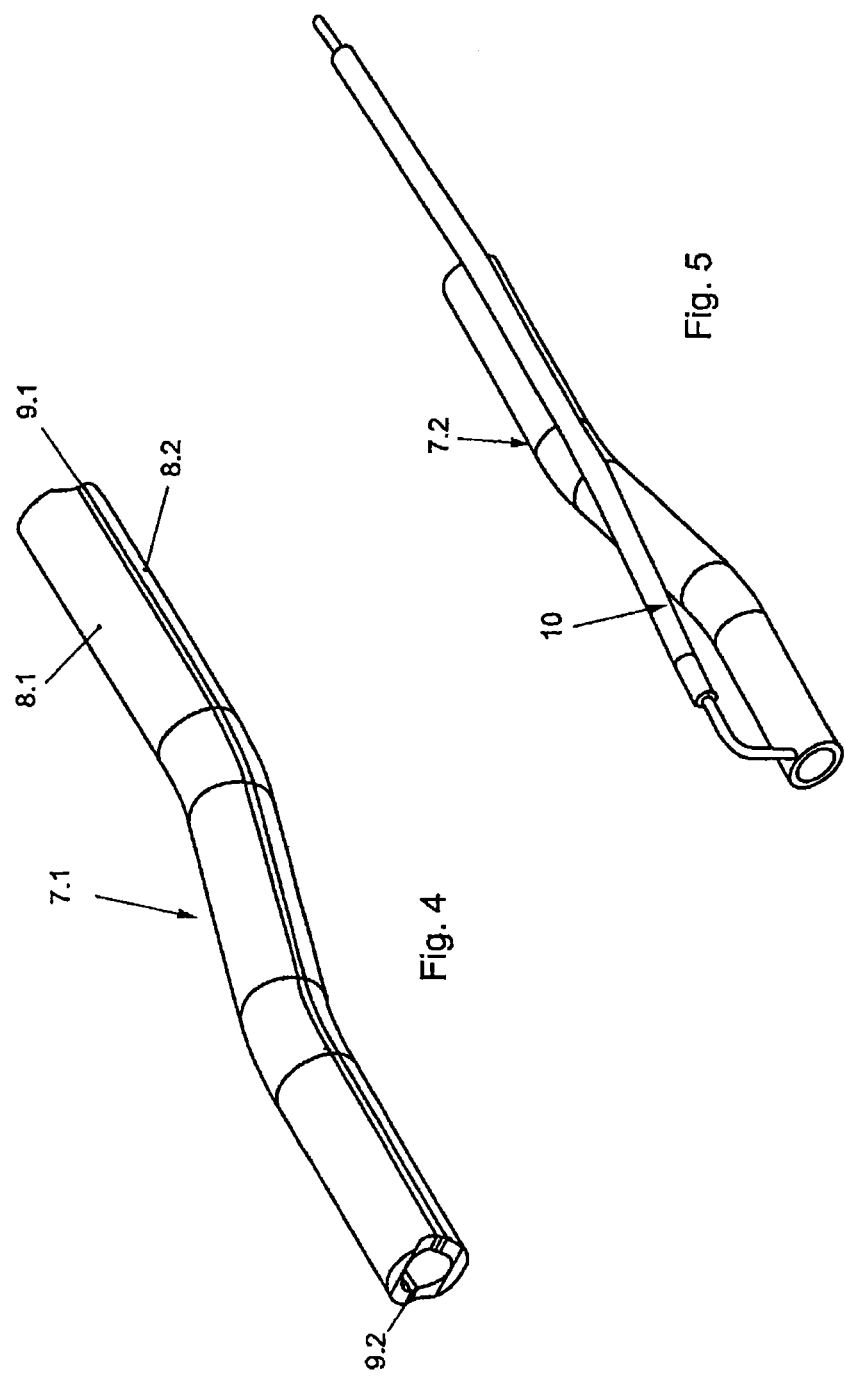

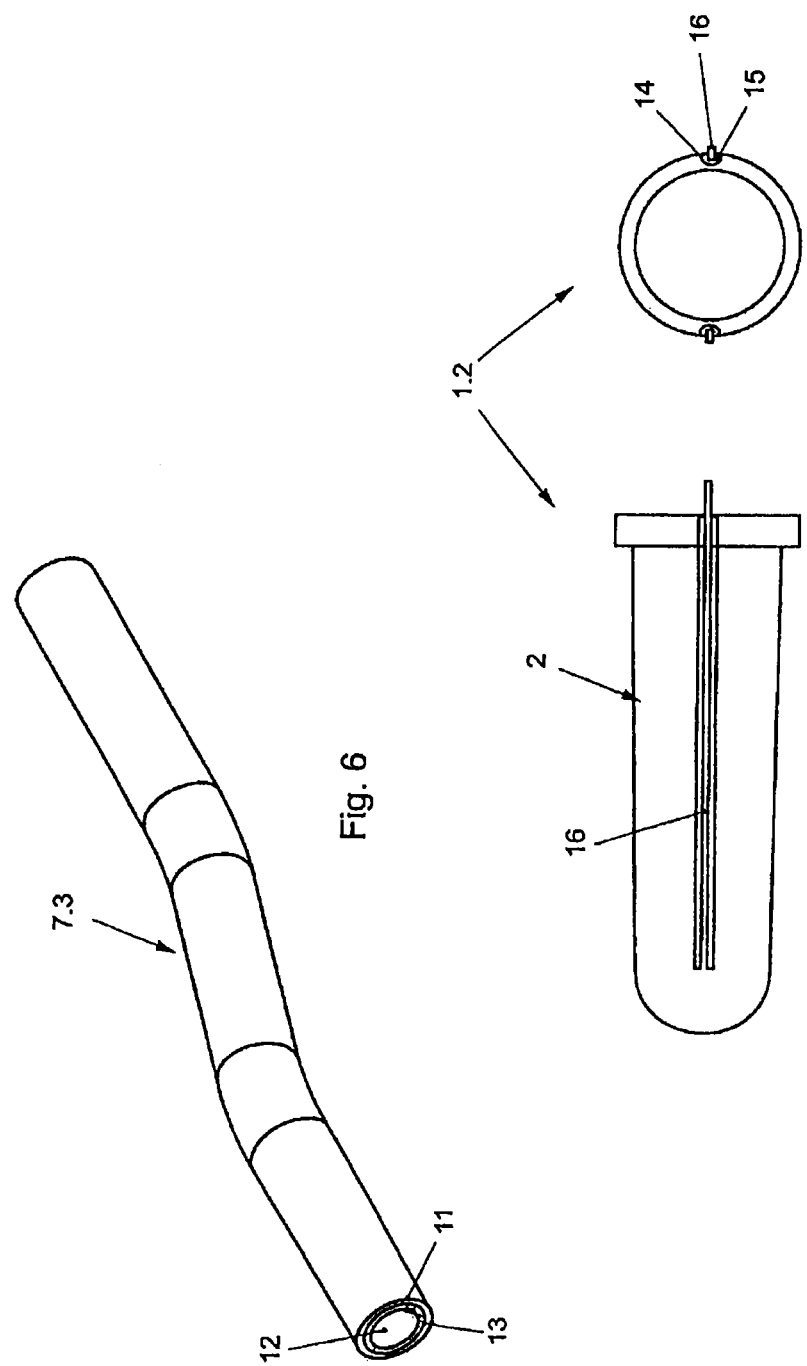

APPARATUS FOR FEEDING ANIMALS

BACKGROUND OF THE INVENTION

The invention relates to an apparatus for feeding animals with a feedstuff, in particular with a liquid feedstuff, the constituents of which or which is guided or processable in at least one component and is suppliable to an output device.

Automatic feeders are known and on the market in a large number of forms and embodiments. Reference is made here in particular to DE 296 06 172.7 U or DE 296 03 702.8 U.

In these automatic feeders, a feedstuff for, for example, calves is mixed up usually from milk powder and then supplied to a point of use via a corresponding supply line. This point of use may be a bowl, but in particular also a teat.

This in particular liquid feedstuff does not generally pass immediately to the point of use from the automatic feeder, but only when it is required, i.e. when for example a calf wishes to drink. This means that this feed has to be left in the automatic feeder even for relatively long periods of time, in which case its temperature can drop in winter and rise in summer. Both of these can be undesired, and therefore for example DE 196 04 199 and DE 198 45 186 propose heating the container, in which the feedstuff is prepared, in the automatic feeder. However, this heating is insufficient, since feedstuff which is not temperature-controlled is already present in the component and also in the output device. In other words, colder feedstuff is located in the component, or output device, in the winter and possibly too warm feedstuff is located there in the summer. Especially young animals perceive this as unpleasant.

It is the object of the present invention to develop an apparatus of the abovementioned type, in which the unpleasant temperature differences are eliminated.

SUMMARY OF THE INVENTION

The object is achieved by an apparatus of the abovementioned type, in which the component and/or the output device is/are temperature-controllable.

Firstly, it is of course possible to provide the component and/or output device with a heating device, to irradiate it/them with heat or to temperature-control materials in the component and/or in the output device by corresponding irradiation or by chemical or physical processes, or to stimulate these materials to change temperature. Primarily and preferably, the components and/or output device itself are intended to be configured in a temperature-controllable manner, i.e. no additional heating devices or insulation devices are intended to be necessary.

The invention relates firstly to the component, specifically any kind of component, regardless of how it is configured. As a rule, the component should be tubular, but the invention is not limited thereto. No limits are intended to be placed on the output device, either. Generally, it is a teat, but the output device may also be in the form of a bowl. It is also conceivable to provide the teat directly on the automatic feeder, with the result that no component would be necessary; on the other hand it is also conceivable to configure the component itself as a teat, such that in this case the component is the output device. As mentioned, many possibilities which are intended to be encompassed by the invention are conceivable here.

Temperature-control should be understood as meaning both cooling and heating. Primarily in summer months, it may be necessary to cool the feedstuff, and in winter it is more likely to need to be heated.

For the purpose of cooling and/or heating, the components and/or output device may be provided in a first embodiment with recesses in which a temperature-control medium is conveyed. It is appropriate here to provide these recesses in the component and/or output device itself. For example, these may be corresponding channels or capillaries. This is important primarily for a coolant.

It is also conceivable to integrate particles into a corresponding plastics material or to produce the plastics material from a material which reacts to particular radiation. Here, there are for example metal nanoparticles or carbon nanotubes which are integrated in the plastics material and react to ultrasound or other radiation with heat or change temperature and emit this change to the environment.

However, it is primarily envisaged for the component and/or the output device itself to be configured as a resistance heater. In the case of a resistance heater, heat is generated in that current is passed through a conductive material, suitable for the purpose, having high electrical resistance, and as a result the material heats up. For example, a suitable electrically conductive material can be introduced into that plastics material from which for example the output device or the component is produced. As a result, the latter itself becomes a resistance heater. Electrically conductive materials may be for example metal meshes, conductive particles, nano-carbon material, for example carbon nanotubes, metal particles etc. What is primarily important here is that a short-circuit between two conductive plastics materials, which would preclude resistance heating of subsequent regions, does not occur too early. In other words, the resistance heater integrated into the output device or the component must be configured such that it heats as far as possible the entire teat or the entire resistance line. Thus, a supply for current without an undesired early return is required.

In a further exemplary embodiment of the invention, the component is configured in a tubular manner and has a connection piece on which the teat is pushed. According to the invention, a resistance heater, which is in the form of a tube coil, is intended to be integrated in the tubular component. As a result, the component itself is heated and transmits the heat to the teat or the liquid present in the teat via the connection piece, or an additional tongue that engages in the teat. Instead of or in addition to this resistance heater, the component can also be surrounded by a tube coil, which conveys a heat transfer medium in itself.

According to a further exemplary embodiment of the invention, the component and/or output device can consist of two plastics regions which are substantially insulated from one another but are interconnected or merge into one another in an end region. This ensures that the current flows from an introduction point to this end region and then back in the other plastics region to a second power connection.

It is also conceivable to produce a main body of the teat or in particular a component in a tubular manner from a plurality of layers, wherein at least one outer layer and at least one inner layer are conductive and are separated from one another by at least one intermediate layer made of insulating material. In this case, the at least two electrically conductive layers are radially connected. The radial connection preferably takes place such that as large a part as possible of the output device or of the component is heated. This takes place preferably in that the live connection of two layers connected to different poles of a power source takes place at the greatest possible distance from this power source.

It is also conceivable for both the component and the output device to be produced as a whole from a conductive material. A groove or other recesses is/are then introduced into this conductive material during or after production. This recess is then filled with an insulating material and a conductor is in turn introduced into this insulating material, said conductor being connected to the conductive main body. This subsequently introduced conductive material should preferably be fitted in such that as far as possible the entire component or the entire output device is heated when current flows.

The return does not otherwise always have to take place in the component or the output device itself. The component and/or output device may be produced overall from a conductive material. In this case, a separate return line is then connected to the main body. The manner in which this return line is configured is intended to be of secondary importance, for example it may be a simple shielded copper cable.

In particular in the case of the component, it may be conceivable for distances to be bridged which signify an excessively long current path. Dangerously high voltages are necessary to heat such long components. For this reason, it may be advisable to subdivide a longer component into sections which each then have the corresponding return line at their end. In this case, it is also envisaged to configure the sections as a parallel circuit.

As a result of the setting of the voltage strength or current strength, a corresponding desired temperature can be achieved in the component and/or the output device. This can otherwise also take place in an automated manner, depending on the measurement of the outside temperature. Reference is made at this point to the fact that temperature measuring devices may be provided. These may be used for example to compare the measured temperature with the desired temperature. In this case, both temperature measuring devices in the interior of the component and/or the output device, that is to say directly in contact with the feedstuff, and temperature measuring devices which are fitted in the vicinity of the component or of the output device may be envisaged.

Furthermore, those embodiments of the invention in which the temperature measuring devices for measuring the outside temperature are arranged at a distance from the component or the output device are also intended to be encompassed by the invention. Such an arrangement may, without structural complexity, serve for example to heat the feedstuff when the temperature drops below a particular preset outside temperature.

Those embodiments which are either coolable or heatable are also intended to be encompassed by the invention. For example, such an apparatus may have capillaries which are filled with a liquid which can be heated or cooled by corresponding devices that are not intended to be defined in more detail. It may also be envisaged to equip an apparatus with capillaries for the cooling function and with conductive material to which a current is intended to be applied for the heating function.

Irrespective of the choice of devices selected for temperature-control, be these capillaries, other tube devices, conductive plastics materials, metal meshes or other devices, it may be envisaged to configure these in a manner not extending in a straight line in the axial direction but rather in a meandering manner. As a result, it is possible for the component or the output device to be heated or cooled in as uniform a manner as possible.

The invention allows not only targeted re-temperature-control of the feedstock as required, but allows errors to be established by the observation of the current flow. If, for example, the apparatus according to the invention is damaged by mice, rats, the animals to be fed or by other causes, this has effects on the current flow or the voltage in the apparatus according to the invention. A device which is not intended to be described in more detail can monitor the current flow or the voltage and establish deviations beyond a preset limit value or other irregularities, record these and optionally initiate measures, for example sending information to the animal owner, via a further device.

It is furthermore possible to use the apparatus according to the invention in order to detect whether an animal has not drunk for some time. This is possible for example in that the resistance heater is configured such that, in addition to a heating function, it also has a function of detecting a drinking animal via the detection of a change in resistance. Since the animal comes into contact with the output device with its mouth while drinking, the current flow in an output device equipped with electrically conductive material inevitably changes.

Furthermore, it is also possible to monitor the temperature of the animal and also the ambient temperature via the monitoring of the resistance heater.

BRIEF DESCRIPTION OF THE DRAWINGS

Further advantages, features and details of the invention can be gathered from the following description of preferred exemplary embodiments and with reference to the drawing; in which:

FIG. 1 shows a side view of a teat according to the invention;

FIG. 2 shows a front view of the teat according to FIG. 1;

FIG. 3 shows a perspective view of the teat according to FIG. 1;

FIGS. 4 to 6 show perspective views of exemplary embodiments of in each case a part of a component according to the invention;

FIG. 7 shows a side view of a further exemplary embodiment of a teat;

FIG. 8 shows a rear view of the teat according to FIG. 7;

DETAILED DESCRIPTION

Figure 9:
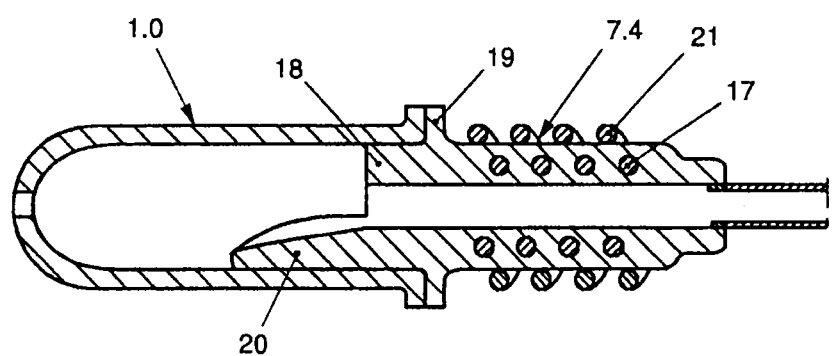
FIG. 9 shows a longitudinal section through a further exemplary embodiment of a teat on a component according to the invention.

According to FIGS. 1 to 3, an output device for a feedstuff, in this case a teat 1.1, consists of a main body 2 which is composed substantially of two plastics shells 2.1 and 2.2. These two plastics shells are interconnected at the tip of the teat by a cap 3 which has an extraction opening 4.

As can be seen in particular from FIG. 3, the two plastics shells 2.1 and 2.2 are separated from one another by two slots 5.1 and 5.2 as far as the region of the cap 3, wherein an insulating material, for example an insulating adhesive, is located in the slots 5.1 and 5.2.

The way in which the invention functions is as follows.

The two plastics shells 2.1 and 2.2 and also the cap 3 consist of an electrically conductive material. A current is applied for example to the plastics shell 2.1 in an end region 6.1 of the teat 1.1. Since the plastics shell 2.1 and 2.2 and also the cap 3 consist of electrically conductive plastics material, the current flows through the plastics shell 2.1 as far as the cap 3, it being insulated from the plastics shell 2.2 by the insulating adhesive in the slots 5.1 and 5.2.

At the tip, the current is introduced into the cap 3 and now flows via the cap 3 into the plastics shell 2.2 and back to an end region 6.2 of this second plastics shell 2.2. As a result of this current flow, resistance heating occurs such that the plastics shells 2.1 and 2.2 and also the cap 3 are heated. This heat can then be transmitted to the feedstuff which is extracted through the teat 1.

FIG. 4 shows a part of a component 7.1 which consists of a plurality of sections. Each section is composed of a plastics shell 8.1 and 8.2 which are in turn each separated from one another by an insulation region 9.1 and 9.2. In this case, it is possible in the case of an only short component 7.1 to interconnect the two plastics shells 8.1 and 8.2 in any desired manner at an end opposite the current introduction point. To this end, for the sake of simplicity, the two plastics shells 8.1 and 8.2 at the end are short-circuited together. For example, an interruption of the two insulation regions 9.1 and 9.2 or any other desired electrical connection between the plastics shell 8.1 and the plastics shell 8.2 may be provided.

If longer regions of a component are intended to be heated, it has been found to be advisable to already interconnect sections of the component between the two ends. This takes place preferably in a parallel circuit, such that uniform heating of the component is ensured.

According to FIG. 5, it is also envisaged for a component 7.2 as a whole to consist, as a tubular structure, of an electrically conductive material. A return line 10 is then assigned to one end of this component 7.2, said return line consisting for example of a cable, in particular a sheathed copper cable.

In another exemplary embodiment of the invention according to FIG. 6, the component 7.3 is configured as a whole in a tubular manner, wherein a tube casing consists of a plurality of layers. For example, an outer layer 11 and an inner layer 12 can consist of an electrically conductive material, wherein the two layers 11 and 12 are separated from one another by an insulating layer 13. Here, too, it is in turn conceivable for the two conductive layers 11 and 12 to be interconnected at one end or sectionally, in order that they can form a resistance heater in this way.

In a further exemplary embodiment of the invention according to FIGS. 7 and 8, a teat 1.2 is formed in a similar manner to the teat according to FIGS. 1 to 3. However, the main body 2 is in one piece as a whole. After it has been produced, one or preferably two grooves 14 are cut into this main body, an insulation material 15 being introduced into said grooves 14. A respective tab 16 which was left when the groove 14 was cut is then introduced as a return line into this insulation material 15. Of course, it is also conceivable for the tab 16 to be introduced separately into the groove 14 or the insulation material 15 and to be connected at its one free end to the main body 2.

In the case of the exemplary embodiment of an apparatus according to the invention for feeding animals, a commercially customary teat 1.0 is pushed onto a tubular component 7.4. This tubular component 7.4 forms to this end a connection piece 18 which is adjoined by a flange 19. The teat rests against this flange 19 in its use position.

According to the invention, a resistance heater 17 can be integrated into this tubular component 7.4, said resistance heater 17 consisting of a corresponding metal tube coil made of resistance wire or the like. The component 7.4 is heated by the resistance heater 17 and transmits its heat, via the flange 19 and the connection piece 18, to the teat 1.0 or to the drinking liquid present in the teat. Transmission is further improved by a tongue 20 which is integrally connected to the component 7.4 and transmits the heat to the liquid in the teat 1.0.

Preferably, instead of—or else in addition to—the resistance heater 17, the component 7.4 can also be surrounded by a tube coil 21 in which a heat transfer medium is conveyed. For example, this may be hot water. The heat is transmitted from the tube coil 21 to the component 7.4 by way of heat exchange.

The invention claimed is:

1. An apparatus for feeding animals a liquid feedstuff, comprising at least one component (7.1-7.4) for processing the feedstuff and an output device (1.0, 1.1, 1.2), supplied with feedstuff from the at least one component, wherein the output device (1.0, 1.1, 1.2) includes means for controlling the temperature of the feedstuff, wherein the at least one component (7.1 to 7.4) and/or the output device (1.1, 1.2) consists of an electrically conductive plastics material having at least two regions (2.1, 2.2; 8.1, 8.2; 11, 12) which are insulated from one another by at least one insulation region (5.1, 5.2; 9.1, 9.2; 13) and are connected together only at a transition point, wherein the output device is connected to the at least one component at one end, and further comprising an extraction opening (4) in the output device opposite to said one end.

2. The apparatus of claim 1, wherein the means for controlling the temperature of the feedstuff further comprises a resistance heater (17) integrated as a tube coil into the at least one component or surrounding the at least one component.

3. The apparatus of claim 1, wherein the means for controlling the temperature of the feedstuff further comprises a tube coil (21) integrated into the at least one component or surrounding the at least one component, wherein the tube coil conveys a heat exchange medium.

4. The apparatus according to claim 1, wherein the at least one component (7.1 to 7.4) and/or the output device (1.1, 1.2) is/are configured to be self-temperature controllable.

5. The apparatus according to claim 1, wherein recesses for a temperature-control medium are provided in the at least one component and/or in the output device.

6. The apparatus according to claim 5, wherein capillaries for guiding the temperature-control medium are formed in the at least one component and/or in the output device.

7. The apparatus according to claim 1, wherein the at least one component and/or the output device is/are further provided with a heating device and/or a cooling device.

8. The apparatus according to claim 1, wherein the at least one component (7.1 to 7.4) and/or the output device (1.1, 1.2) is/are configured as a resistance heater.

9. The apparatus according to claim 1, wherein elements of the means for controlling temperature are integrated into the at least one component (7.1 to 7.4) and/or the output device (1.1, 1.2) itself.

10. The apparatus according to claim 1, wherein electrically conductive materials are integrated into the at least one component (7.1 to 7.4) and/or the output device (1.1, 1.2).

11. The apparatus according to claim 10, wherein the electrically conductive materials are provided along a length of the at least one component (7.1 to 7.4) and/or the output device (1.1, 1.2).

12. The apparatus according to claim 1, wherein the at least one component (7.4) is configured in a tubular manner and has a connection piece for pushing on the output device (1.0).

13. The apparatus according to claim 12, wherein the output device (1.0) butts against a flange (19).

14. The apparatus according to claim 12, wherein a tongue (20) projects from the at least one component (7.4) into the output device (1.0), wherein the tongue is likewise temperature-controllable.

15. The apparatus according to claim 1, wherein the electrically conductive plastics material comprises electrically conductive carbon compounds and carbon nanotubes.

16. The apparatus according to claim 1, wherein the at least one component and/or the output device consists of at least two shell-like plastics parts (2.1, 2.2; 8.1, 8.2) having ends, a connection (3) at the ends, and insulation strips (5.1, 5.2; 9.1, 9.2) between the shell-like plastic parts.

17. The apparatus according to claim 1, wherein the at least one component (7.2) and/or the output device consists of an electrically conductive plastics material, to which a return line (10) for current is connected.

18. The apparatus according to claim 17, wherein the return line is a shielded cable (10).

19. The apparatus according to claim 18, wherein at least one recess (14), into which the return line (16) is inserted in an insulated manner, is formed in the at least one component and/or the output device (1.2).

20. The apparatus according to claim 1, wherein the at least one component (7.3) and/or the output device is/are configured in a tubular manner, wherein this tube consists of at least two layers (11, 12) of conductive, interconnected material, between which a layer (13) of insulating material is arranged.

21. The apparatus according to claim 1, wherein the at least one component (7.1 to 7.4) and/or the output device is/are subdivided into subregions, to which current is applied in a parallel circuit.

22. An apparatus for feeding animals a liquid feedstuff, comprising at least one component (7.1-7.4) for processing the feedstuff and an output device (1.0, 1.1, 1.2), supplied with feedstuff from the at least one component, wherein the output device (1.0, 1.1, 1.2) includes means for controlling the temperature of the feedstuff, wherein the means for controlling the temperature of the feedstuff comprises electrically conductive regions defined along the output device, wherein the electrically conductive regions are electrically insulated from each other along the output device and electrically connected together at a transition point such that the regions and transition point define a resistance heater.

* * * * *